United States Patent [19] [11] Patent Number: 4,540,202
Amphoux et al. [45] Date of Patent: Sep. 10, 1985

[54] ARTICULATED TUBULAR CONDUIT ARM FOR SUCKING GASEOUS FLUIDS

[76] Inventors: André Amphoux, 12, rue Jules César, 75012 Paris; Jean M. Carbon, 1, rue des Vignerous, 95110 Sannois, both of France

[21] Appl. No.: 346,753
[22] Filed: Feb. 8, 1982
[30] Foreign Application Priority Data Feb. 10, 1981 [FR] France ................. 81 02561

[51] Int. Cl.³ .......................... F16L 27/00
[52] U.S. Cl. ..................... 285/184; 285/114; 285/181; 285/226; 285/235; 15/314; 403/111
[58] Field of Search ............ 285/114, 184, 185, 226, 285/223, 181, 235; 15/314; 403/111

[56] References Cited

U.S. PATENT DOCUMENTS

| 657,567 | 9/1900 | Robinson | 285/235 X |
| 828,439 | 8/1906 | Strunsky | 15/314 |
| 1,625,684 | 4/1927 | Roddy | 285/235 X |
| 3,374,347 | 3/1968 | Hirose | 403/111 |
| 3,911,954 | 10/1975 | Johnson | 285/184 X |
| 4,158,462 | 6/1979 | Coral | 285/184 X |

FOREIGN PATENT DOCUMENTS

| 137933 | 11/1952 | Sweden | 285/226 |
| 2046858 | 11/1980 | United Kingdom | 285/226 |

Primary Examiner—Richard J. Scanlan, Jr.
Attorney, Agent, or Firm—Darby & Darby

[57] ABSTRACT

This suction arm for gaseous fluids comprises a tubular articulated conduit consisting of at least one flexible sleeve (5) disposed between two rigid tubes (8). These tubes (8) are interconnected at either end of the flexible intermediate sleeve (5) by mechanical holding means (9) comprising each at least one pair of first and second members (10a, 10b) pivotally interconnected centrally of the flexible sleeve and rigidly assembled in side by side relationship by distance-pieces (15) under the control of a spiral return spring (13) and detent-positioning means (16, 17, 18), whereby the two rigid tubes (8, 8) are constantly urged to their relative angular position matching that of the ends of the intermediate flexible sleeve (5).

20 Claims, 2 Drawing Figures

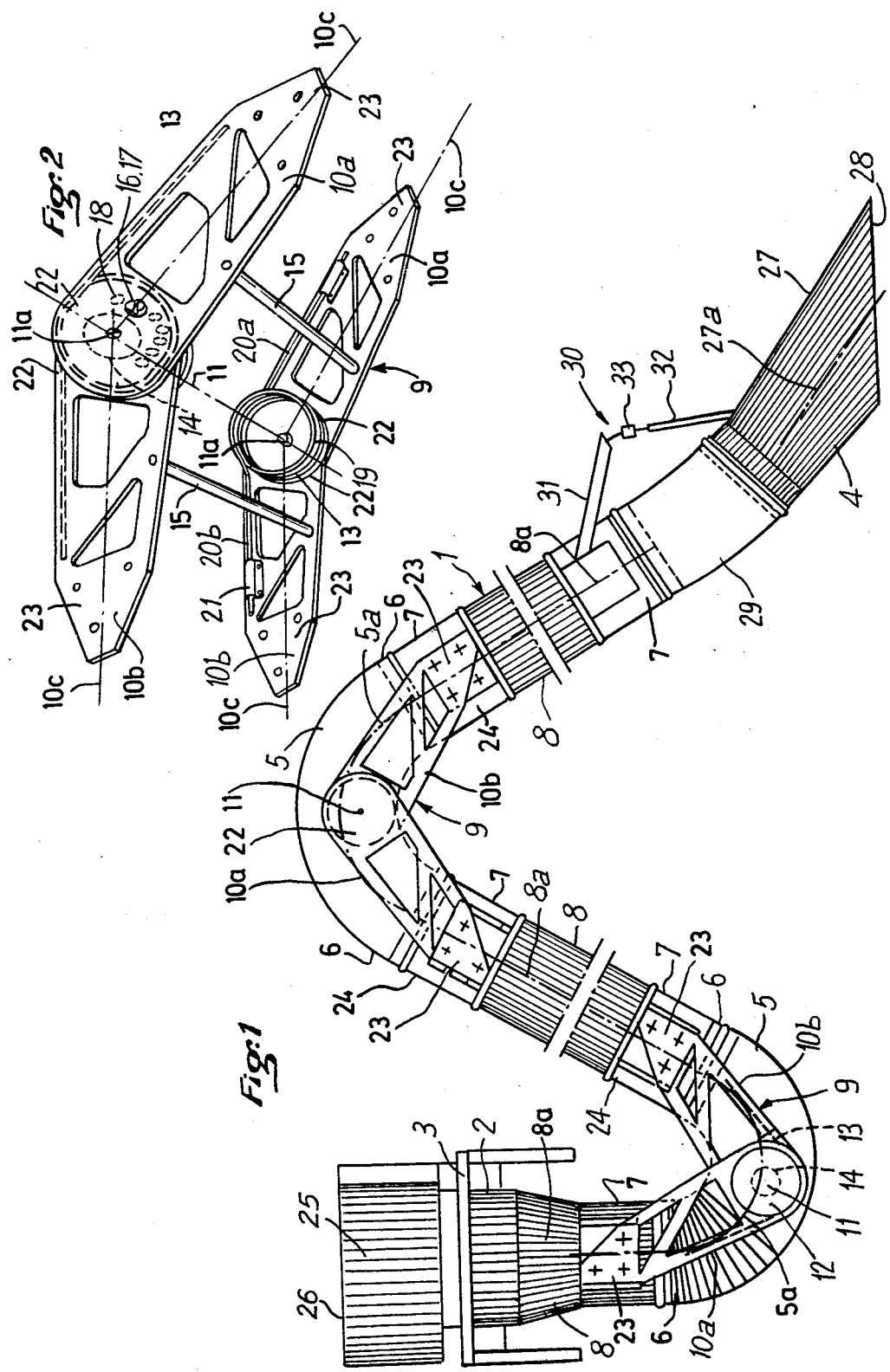

ARTICULATED TUBULAR CONDUIT ARM FOR SUCKING GASEOUS FLUIDS

BACKGROUND OF THE INVENTION

1. Field of the Invention

The present invention relates to a flexible, jointed suction arm for gaseous fluids.

This arm comprises a first end and a second end; the first end is fastened to a support; its second end is free, provided with a suction funnel and is movable in all directions according to requirements while remaining, in the absence of any external control action, in the position in which it was previously brought. This suction arm is adapted to suck in dangerous or polluting smokes or vapors, dust, and/or solid particles in suspension in the atmosphere, in the vicinity of a working station (painting cabs, welding rooms, etc.).

2. The Prior Art

Suction arms of this type are already known. In a first form of embodiment the conduit is completely flexible and supported by a deformable suspension device, so that the assembly is rather complex, expensive, cumbersome and awkward. If the suspension device is disposed within the conduit, the suction output is reduced and the suspension device itself is exposed to the corrosive action of the gaseous fluid flowing in the conduit. In another known structure the suction arm comprises a sequence of rigid tubular sections coupled by means of joints and external holding means (cf. U.S. Pat. No. 3,298,544), thus constituting a complicated assembly scarcely adapted for the use contemplated and ill suited for temporarily interlocking the tube sections.

In a third form of embodiment the suction arm comprises a series of successive rigid tubes and flexible sleeves. The rigid tubes are hingedly interconnected by coupling means comprising a brake. Linear compensating springs such as coil springs are attached to external points of the arms in order to preserve the arm balance in its various positions. This construction is attended however by various inconveniences; thus, the linear coil spring increases the overall dimensions of the arm, which may prove detrimental in actual operation. Besides, the spring is exposed to accidental external actions likely to jeopardize the operator or operators and to damage the arm proper. Furthermore, the spring does not operate under optimal conditions since it opposes a linear return force to the torque reaction resulting from the weight of the overhanging arm. This return force is not subordinate only to the relative position of the successive sleeves. The return force of this spring is limited and consequently either the suction power of the arm is limited or the operator is compelled to constantly move the arm in order to bring same in close vicinity of the working station. In this case the movements imparted to the arm are not only numerous but also inaccurate and rude. Moreover, in this known structure, it is not possible to provide a spring for each flexible sleeve, if this measure were deemed necessary. Finally, the arm cannot be locked in all the desired positions and the end suction nozzle cannot be moved in all directions about a point. Therefore, an arm of this specific type is awkward, has a reduced power, is dangerous in operation and requires many movements.

SUMMARY OF THE INVENTION

This invention provides a suction arm capable of avoiding the inconveniences set forth hereinabove. This improved suction arm for gaseous fluids consists essentially of a tubular flexible conduit comprising at least one flexible sleeve interposed between at least two rigid tubes interconnected by mechanical holding means comprising two holding and protection members pivotally interconnected and a built-in spiral return spring.

A member for temporarily locking the arm in at least one predetermined position may if desired be incorporated in the holding means. The form of embodiment of the holding and protection members imparts the best possibilities of use to the arm. The end suction nozzle is pivotally mounted about a ball-joint.

The suction arm according to this invention is of simple, reliable construction. Its shape can easily be modified by the operator with the desired degree of precision, without requiring any complicated handling. Once the arm is set in a given position, the latter is preserved, whatever it be, notwithstanding the weight of the suction arm. The arm may also be locked temporarily in a given position. The principle of the mechanical holding means and notably the spiral spring used therefor is such that if desired a spiral spring of this kind can be associated with each flexible sleeve. The spiral spring may thus exert a relatively considerable force, so that the weight of the arm and consequently its diameter can be increased, with the advantage of a greater suction capacity, so that the suction force remains satisfactory even if the suction nozzle is relatively remote from the suction area. Therefore, unceasing and tedious movements of the suction funnel are avoided. The maintenance of the suction arm is particularly easy, and both the return spring and the flexible sleeves are safely protected.

The specific features of this invention will appear more clearly as the following description of a typical form of embodiment thereof proceeds with reference to the attached drawing.

THE DRAWING

FIG. 1 is a diagrammatic side elevational view of the suction arm constituting the subject-matter of this invention, the plane of the Figure being the plane of the arm, and FIG. 2 is a diagrammatic perspective view of the mechanical means provided for holding the arm in the selected position, with the locking and return means incorporated therein.

DESCRIPTION OF THE PREFERRED EMBODIMENT

The suction arm 1 for gaseous fluids according to this invention consists of a flexible conduit having a first end 2 fastened to a support 3 and a second, free end 4 adapted to be moved in all directions as required but remaining automatically in the last position in which it was brought, in the absence of any external force.

The conduit comprises at least one flexible sleeve 5 having its two end portions 6 rigidly coupled to the corresponding end portions 7 of a pair of rigid tubes 8.

The flexible and rigid sleeves 5, 8 alternating with each other are adapted to be coupled in end to end relationship to constitute the conduit. They have for example a circular and preferably substantially constant cross-section along the conduit, with a diameter of up to and even more than 175 millimeters. The rigid tubes 8 are preferably rectilinear. Suitable coupling means such as flanges are provided for assembling the flexible and rigid sleeves 5, 8. The rigid tubes 8 consist preferably of metal or plastic material, and the flexible sleeves 5 consist preferably of pleated plastic to accomodate the necessary flexibility.

Mechanical conduit holding means 9 are incorporated in the suction arm 1, that is, disposed either on the conduit wall or in close vicinity thereof, irrespective of the conduit position, therefore without increasing appreciably the overall dimensions of the assembly. Thus, a particularly compact suction arm is obtained. The holding means 9 are associated with a pair of adjacent rigid tubes 8 and register with an intermediate flexible sleeve 5. The holding means 9 comprise at least two rigid elongated coupled holding and protection members 10a, 10b forming a rigid structure pivotally mounted about a central shaft 11. These members 10a, 10b have their outer ends rigidly connected to the end portions 7 of the adjacent rigid tubes or sleeves 8.

Preferably, the central shaft 11 is disposed horizontally. In this case, both members 10a, 10b are disposed in vertical planes. The axes 8a and the central line of sleeves 8 and 5 are also disposed in a common vertical plane referred to as the arm plane (which is the plane of FIG. 1). The arm 1 is mounted for operation in overhanging or outboard condition, and tends by gravity to pivot and/or undergo a downward distortion, notably at its outlet end 2.

The holding means 9 has the twofold function of interconnecting the adjacent rigid tubes 8 and protecting the intermediate flexible sleeve 5 against lateral shocks or bruises, while permitting the distortion of the three sequential sections 8, 5, 8 through the relative pivoting of the two tubes 8 about the central shaft 11. For this purpose, the holding members 10a and 10b and the central shaft 11 are disposed laterally and across the corresponding flexible sleeve 5, respectively.

The holding means 9 have mounted therein on the one hand a spiral return spring 13 normally urging the two members 10a and 10b and therefore the corresponding tubes 8 for rotation in relation to each other in a direction opposed to gravity, i.e. the direction due to the inherent weight of the arm 1, and on the other hand a braking member 14 counteracting the relative pivotal movement of said members 10a and 10b and therefore of the corresponding tubes 8.

With this combination of a spiral spring 13 and a braking member 14 it is possible to counter-balance the weight of the overhanging arm 1 and to hold same in any desired position while permitting its distortion.

The holding means further comprise a member 12 for temporarily locking or detent-positioning the members 10a and 10b and therefore the corresponding tubes 8 in relation to each other in at least one relative predetermined position. Preferably, several locking positions, notably those located at spaced intervals about the axis 11, are provided.

Also preferably, the holding means 9 comprise two pairs of assemblies 10a, 10b. These two pairs of assemblies 10a, 10b are disposed side by side and spaced laterally from each other to provide a free gap therebetween for receiving the corresponding sleeve 5. Each member 10a, 10b of a pair is rigidly connected to the corresponding and registering member 10a, 10b of the other pair by means of at least one distance-piece 15.

Each holding member 10a, 10b comprises a flat elongated and preferably perforated blank having on the one hand an end portion 22 adapted to be pivotally coupled to the other member 10b or 10a and to receive the detent-positioning or locking device 12, the return spiral spring 13 and the braking member 14, and on the other hand an opposite end portion 23 adapted to be fastened to a flanged element 24 rigidly secured to the end portion 7 of a rigid tube 8. Preferably, the end portion 23 is disposed at right angles to the axis 8a of the corresponding tube 8. The longitudinal axis 10c of a member 10a or 10b is somewhat inclined in relation to the axis 8a of the corresponding rigid tube 8 on the side of the acute angle formed by the two adjacent tubes 8. The two members 10a, 10b are pivotally interconnected for example by means of a pivot pin engaged by a tightening screw 11a.

The detent-positioning or locking member 12 consists for example of a ball 16 carried by one of the holding members 10a on the inner face thereof and urged by resilient means 17 for engagement in one of a plurality of blind holes 18 formed in the outer face of the other member 10b. Either one single blind hole 18 or a plurality of such holes (seven being shown by way of example in FIG. 2) is or are provided. If a plurality of blind holes are provided, they are disposed on a common circle concentric to the axis 11. If desired, the ball 16 is associated with the external member (10a) so that on the one hand the blind holes 18 are formed on the inner member and therefore not visible from the outside and properly protected, and on the other hand access to the ball 16 and resilient member 17 is greatly facilitated for adjustment or replacement purposes.

The spring 13 comprises intermediate turns 19 and two rectilinear end portions 20a, 20b rigidly attached the one to member 10a and the other to member 10b, respectively, by means of anchoring staples 21 or the like. The spiral spring 13 is disposed on and across the inner face of members 10a and 10b, i.e. in the cavity formed thereby. Thus, the spiral spring 13 is invisible laterally from outside and efficiently protected by said members 10a and 10b. With this arrangement, the spiral spring 13 does not increase the overall dimensions of the conduit. A maximum safety is obtained by using this spiral spring 13 since it is protected and operates under normal conditions, and therefore is not liable to break. Even in case of spring failure, it would not make the device unsafe since its two ends 20a, 20b are fastened to the corresponding members 10a, 10b and the spring operates only by rotation. The central turns 19 are wound about the axis 11. The length of this spiral spring 13 and its wire diameter are calculated as a function of the weight of suction arm 1. The use of a spiral spring 13 as shown, instead of any other non-equivalent type (notably a linear spring) is particularly advantageous. In fact, this spiral spring 13 produces a return torque which is antagonistic to the gravity torque due to the weight of arm 1; this return torque is subordinate only to the angular relationship of the corresponding rigid tubes 8; thus, it will respond to the operator's control action with a high degree of precision, thus avoiding abnormal and sudden efforts; the tubes 8 are constantly subjected to a bending stress in the direction of the metal grain.

The braking member 14 consists for example of a friction disc utilized as a constantly-operating sliding element interposed between the two members 10a and 10b in the end portions 22 thereof. The braking force is adjustable by means of the screw 11a tightening the two members 10a tightening the two members 10a and 10b to each other.

In the form of embodiment illustrated, the arm 1 has the general configuration of two successive V's having a common side, namely the first side (directed towards the end 2) in its normal direction and the second side (directed towards the end 4) inverted. The conduit comprises two flexible sleeves 5 and three rigid tubes 8. The two axes 11 of the two holding means 9 associated with the two flexible sleeves 5 are horizontal and parallel to each other. If desired, only the means 9 adjacent the outlet end 2 comprise a spiral spring 13, and no spring is provided on the means 9 adjacent the end 4. This arrangement can be obtained without appreciably altering the means 9. The braking member 14 adjacent the outlet end 2 may be such as to exert a greater braking power than that exerted at the inlet end 4.

The rigid tube 8 disposed at the outlet end 2 may if desired be directed upwards and associated with support means 3 so as to be adapted to pivot about a vertical axis 25 by means of a rotary flange or the like. This tube 8 at the arm end 2 may comprise coupling means (not shown) for fitting a complementary or auxiliary suction hose adapted to be used by the operator when necessary. Also associated with support means 3 is a conduit 26 of a suction system communicating with said rigid tube 8.

At its opposite or suction end 4 the conduit of the present invention comprises preferably a terminal rigid suction nozzle 27 having an axis 27a and an inlet aperture 28 strongly inclined to the axis 27a (for example with an angle of about 135°) so as to provide a relatively broad suction area normally disposed substantially horizontally for a better efficiency. This nozzle 27 is associated with the last rigid tube 8, at the conduit suction end 4, with the interposition of a flexible sleeve 29 having substantially the same properties as the other flexible sleeves 5. Also associated with the nozzle 27 and flexible sleeve 29 are second mechanical holding means 30 comprising for example a rigid frame structure 31 constituting a convenient handle rigidly connected to said last rigid tube 8 near the end thereof coupled to the flexible sleeve 29, said handle projecting from the top of this sleeve 8 and also above the flexible sleeve 29; preferably, this handle 31 making an angle of about 45° with the axis 8a of tube 8. The holding means 30 further comprises a support 32, for example in the form of a rod, rigidly associated with the nozzle 27 and projecting above the latter towards the frame structure 31 inclined to the axis 27a. Finally, the holding means 30 comprises a member 33 in the form of a ball-coupling interconnecting the frame 31 and support 32 and comprising locking means permitting the swivel movements of the nozzle 27 in all directions about the ball-coupling 33; with this arrangement, the suction arm can be operated very conveniently and effortlessly while it is locked temporarily in relation to the last rigid sleeve 8 in any desired position.

If necessary, an adjustment flap valve (or a pivot or sliding shutter, or the like) may be mounted inside the nozzle 27 for regulating at will the suction throughput, this valve being controlled from external means (such as a handle or the like).

Besides, a handle (not shown) may be rigidly secured to the top of nozzle 27, if desired.

In addition, a spotlight (not shown) protected by a suitable casing may be fitted inside the nozzle 27 for illuminating the working area.

The holding means 9 adjacent the conduit inlet end 4 may comprise a spring for axially compressing the two members 10a, 10b against each other and also against the braking member 14.

The holding means 9 may also comprise on their inner face a ring or stud means extending along the axis 11 outwards to constitute external stop means for the spiral spring 13 in case of breakage thereof, thus imparting a positive safety feature to this spring.

What is claimed is

1. An artificial suction conduit for gaseous fluids, comprising at least two rigid tubes, a flexible sleeve disposed between and tightly connected to said tubes, mechanical articulation means comprising at least two arms rigidly connected one to each of said tubes an interconnected for pivoting about an axis transverse to the longitudinal axes of said tubes, and spring means connected between said arms to urge said arms towards a position wherein said rigid tubes are aligned with each other, said spring means being a helicoidal coil spring comprising turns coaxial with said pivot axis and free end portions rigidly connected to said arms.

2. The suction conduit of claim 1, wherein said coil spring is placed on and at right angles to the inner faces of said arms.

3. The suction conduit of claim 1, wherein at least one braking member is interposed between said holding members and consists of a slip-action friction disc acting continually, the braking force being adjustable by means of a tightening screw constituting the pivot axis between said arms.

4. The suction conduit of claim 1, wherein said articulation means are disposed against or in close vicinity of and along the conduit, irrespective of the conduit position, therefore without increasing the spatial requirement of the conduit.

5. The suction conduit of claim 4, wherein said arms, particularly the pivoted ends thereof, are disposed laterally and at right angles to the flexible sleeve for laterally protecting said sleeve and said spring means.

6. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, at least one device for temporarily locking said arms in at least one predetermined relative angular position being provided in said articulation means, and spring means connected between said arms to urge said arms towards a position wherein said rigid tubes are aligned with each other.

7. The suction conduit of claim 6, wherein each of said arms is rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

8. The suction conduit of claim 6, wherein said locking device comprises a ball carried by one of said arms and urged by resilient means into at least one recessed hole formed in the other arm.

9. The suction conduit of claim 8, wherein each of said arms is rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

10. The suction conduit of claim 8, wherein said locking ball is located on the inner face of the outer arm, and said recessed hole or holes is or are formed in the outer face of the inner arm.

11. The suction conduit of claim 10, wherein each of said arms is rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

12. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, and spring means connected between said arms to urge said arms towards a position wherein said rigid tubes are aligned with each other, each of said arms being rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

13. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, spring means connected between said arms to urge said arms towards a position wherein said rigid tubes are aligned with each other, and a suction nuzzle being provided at the inlet end of the conduit and connected through a flexible sleeve to the adjacent rigid tube of the conduit, said nozzle and adjacent rigid tube being interconnected by second mechanical articulation means comprising a frame rigidly connected to said adjacent rigid tube, a support member rigidly connected to said nozzle and a member interconnecting said support member and said frame.

14. The suction conduit of claim 13, wherein the terminal opening of said nozzle is inclined in relation to the nozzle axis.

15. The suction conduit of claim 13, wherein said frame forms a handle connected to said adjacent rigid tube in the region of its connection with said flexible sleeve connected to said nozzle, said frame projecting above said rigid tube and said flexible sleeve and being inclined with respect to the tube axis.

16. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, and spring means connected between said arms to urge said arms towards a position wherein said rigid tubes are aligned with each other, said spring means being a coil spring comprising turns coaxial with said pivot axis and free end portions rigidly connected to said arms, said coil spring being placed on and at right angles to the inner faces of said arms, each of said arms being rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

17. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, spring means connected between said arms to urge said arms towards a position wherein said rigid tubes are aligned with each other, at least one braking member interposed between said arms, said at least one braking member including a slip-action friction disc acting continually, the braking force being adjustable by means of a tightening screw constituting the pivot axis between said arms, each of said arms being rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

18. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, and spring means connected between said arms to urge said arms towards a position wherein said rigid tubes are aligned with each other, said articulation means being disposed against or in close vicinity of and along the conduit, irrespective of the conduit position, therefore without increasing the spatial requirements of the conduit, each of said arms being rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

19. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, and spring means connected between said arms to urge said arms towards a position wherein said rigid tubes are aligned with each other, said spring means being a coil spring comprising turns coaxial with said pivot axis and free end portions rigidly connected to said arms, each of said arms being rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

20. An artificial suction conduit for gaseous fluids, comprising at least two rigid tubes, a flexible sleeve disposed between and tightly connected to said tubes, mechanical articulation means comprising at least two arms rigidly connected one to each of said tubes and interconnected for pivoting about an axis transverse to the longitudinal axes of said tubes, and spring means connected between said arms to urge said arms towards a position wherein said rigid tubes are aligned with each other, said articulation means being disposed against or in close vicinity of and along the conduit, irrespective of the conduit position, therefore without increasing the spatial requirement of the conduit, said arms being disposed laterally and at right angles to the flexible sleeve for laterally protecting said sleeve and said spring means, each of said arms being rigidly connected by its end portion to the end portion of the rigid tube, said end portion of the arm being situated at right angles to the longitudinal axis of said rigid tube, the longitudinal axis of said arm being inclined to the longitudinal axis of said rigid tube on the side of the inside angle formed by the two adjacent rigid tubes.

* * * * *